United States Patent [19]

Ryu

[11] Patent Number: 4,546,323
[45] Date of Patent: Oct. 8, 1985

[54] QUADRATURE AMPLITUDE DEMODULATOR COMPRISING A COMBINATION OF A FULL-WAVE RECTIFYING CIRCUIT AND BINARY DETECTORS

[75] Inventor: Toshihiko Ryu, Tokyo, Japan
[73] Assignee: NEC Corporation, Japan
[21] Appl. No.: 527,621
[22] Filed: Aug. 29, 1983

[30] Foreign Application Priority Data

Aug. 28, 1982 [JP] Japan ............................ 57-148526

[51] Int. Cl.$^4$ ............................................. H03D 3/18
[52] U.S. Cl. .................................. 329/124; 329/146; 455/260
[58] Field of Search ............... 329/50, 124, 133, 146; 455/245, 260, 337

[56] References Cited

U.S. PATENT DOCUMENTS 3,970,946  7/1976  Matsuo ............................ 329/135 X
4,134,075  1/1979  Washio et al. ................... 329/124 X

FOREIGN PATENT DOCUMENTS 0131151  8/1982  Japan .
0131152  8/1982  Japan .

Primary Examiner—Eugene R. LaRoche
Assistant Examiner—Robert J. Pascal
Attorney, Agent, or Firm—Sughrue, Mion, Zinn, Macpeak, and Seas

[57] ABSTRACT

In a demodulator for use in deriving demodulated signals from a modulated signal subjected to k-by-k quadrature amplitude-and-phase modulation where k is equal to $2^N$ and N is an integer greater than unity, first and second detection signals, each having k-levels, are derived from the modulated signal by a coherent detecting circuit (21, 22, 24, 26, 28) and processed by first and second processing circuits (31, 32). Each of the first and the second processing circuits is implemented by a combination of (N−1) full-wave rectifier(s) (35) and N+2) binary detectors (34, 36–38; 42, 46–48) to produce each set of binary signals and each additional binary signal divisible into a pair of partial bit signals. Alternatively, each processing circuit is implemented by a combination of N full-wave rectifiers and first through (N+1)-th binary detectors. The first through the N-th detectors detect each set while the (N+1)-th detector, each additional binary signal. Anyway, each set serves to produce the demodulated signals while each additional binary signal, an AGC signal and an APC signal.

5 Claims, 7 Drawing Figures

QUADRATURE AMPLITUDE DEMODULATOR COMPRISING A COMBINATION OF A FULL-WAVE RECTIFYING CIRCUIT AND BINARY DETECTORS

BACKGROUND OF THE INVENTION

This invention relates to a demodulator for use in deriving demodulated signals from an input signal subjected to multiple quadrature amplitude modulation (often abbreviated to QAM). It is to be noted throughout the instant specification that k-by-k quadrature amplitude modulation is used as the multiple quadrature amplitude modulation where k is equal to $2^N$ and N represents an integer which is greater than unity and that the input signal has a pair of phase components, each having k-levels. Such modulation may be called an M-ary ($M = k^2$) quadrature amplitude modulation.

In order to favorably demodulate such an input signal into demodulated signals, a reference carrier wave should precisely and stably be produced in a demodulator of the above-mentioned type, as well known in the art. In addition, a d.c. drift resulting from variation of a d.c. source voltage should strictly be suppressed in the demodulator so as to keep an eye aperture invariable in an eye pattern.

In Japanese Unexamined Patent Publication No. Syô 57-131151, namely No. 131151/1982, Y. Yoshida discloses a demodulator comprising a voltage-controlled oscillator circuit for producing a pair of oscillation signals, a pair of phase detectors responsive to an input signal and the oscillation signals for producing a pair of baseband signals phase-detected, and a pair of analog-to-digital converters responsive to the baseband signals for producing digital signals in a bit parallel fashion. The digital signals are partly produced as demodulated signals and partly processed into a phase control signal in compliance with a predetermined logic rule to be fed back to the voltage-controlled oscillator circuit. As a result, the voltage-controlled oscillator circuit generates the phase-controlled oscillation signals serving as the reference carrier wave.

In another Japanese Unexamined Patent Publication No. Syô 57-131152, namely, No. 131152/1982, Yashida also reveals another demodulator similar in structure to the above-mentioned demodulator except that a gain control operation is carried out by the use of a gain control signal to suppress the d.c. drift. For this purpose, the digital signals supplied from at least one analog-to-digital converter are processed into the gain control signal in compliance with another logic rule.

At any rate, the analog-to-digital converters are used to discriminate levels of each phase component. Each analog-to-digital converter becomes intricate and expensive with an increase of the levels.

SUMMARY OF THE INVENTION

It is an object of this invention to provide a demodulator which is capable of carrying out both phase control and gain control operations.

It is another object of this invention to provide a demodulator of the type described, which is economical.

A demodulator to which this invention is applicable is for demodulating a gain controlled signal having a first and a second phase component into demodulated signals. The first and the second phase components have a quadrature phase difference relative to each other and a first and a second input level, respectively. The demodulator comprises a gain controllable amplifier responsive to an automatic gain control signal for gain-controlling a demodulator input signal to produce the gain controlled signal with the first and the second input levels given a first and a second one of first through k/2-th and (k/2+1)-th through k-th successively descending levels at a time, respectively, where k is equal to $2^N$ where, in turn, N represents an interger greater than unity. The first through the k/2-th levels are symmetric to the k-th through the (k/2+1)-th levels on both sides of a median level. The demodulator comprises coherent detecting means responsive to an automatic phase control signal for detecting the first and the second phase components to produce first and second detection signals, respectively, the first detection signal having a first detection level corresponding to the first input level, the second detection signal having a second detection level corresponding to the first input level, first processing means for processing the first detection signal to produce a first set of binary signals and a first additional binary signal, the first set being representative of the first detection level and comprising a first most significant bit signal and at least one first less significant bit signal, and second processing means for processing the second detection signal to produce a second set of binary signals and a second additional binary signal, the second set being representative of said second detection level and comprising a second most significant bit signal and at least one second less significant bit signal. The demodulator further comprises output producing means for producing the first and the second sets as the demodulated signals, gain control signal producing means responsive to at least one of a combination of the first set and the first additional binary signal and another combination of the second set and the second additional binary signal for producing the automatic gain control signal, and phase control signal producing means responsive to the first and the second sets and the first and the second additional binary signals for producing the automatic phase control signal.

According to this invention, the first processing means comprises a first binary detector having a first reference level equal to the median level and responsive to the first detection signal for detecting whether or not the first detection level is higher than the first reference level to produce the first most significant bit signal, first full-wave rectifying means for carrying out full-wave rectification of the first detection signal to produce a first rectified signal, and first discriminating means coupled to the first full-wave rectifying means for discriminating the first less significant bit signal and the first additional binary signal from the first rectified signal. The second processing means comprises a second binary detector having a second reference level equal to the first reference level and responsive to the second detection signal for detecting whether or not the second detection level is higher than the second reference level to produce the second most significant bit signal, second full-wave rectifying means for carrying out full-wave rectification of the second detection signal to produce a second full-wave rectified signal, and second discriminating means coupled to the second full-wave rectifying means for discriminating the second less significant bit signal and the second additional binary signal from the second rectified signal.

DESCRIPTION OF THE PREFERRED EMBODIMENTS

Figure 1:
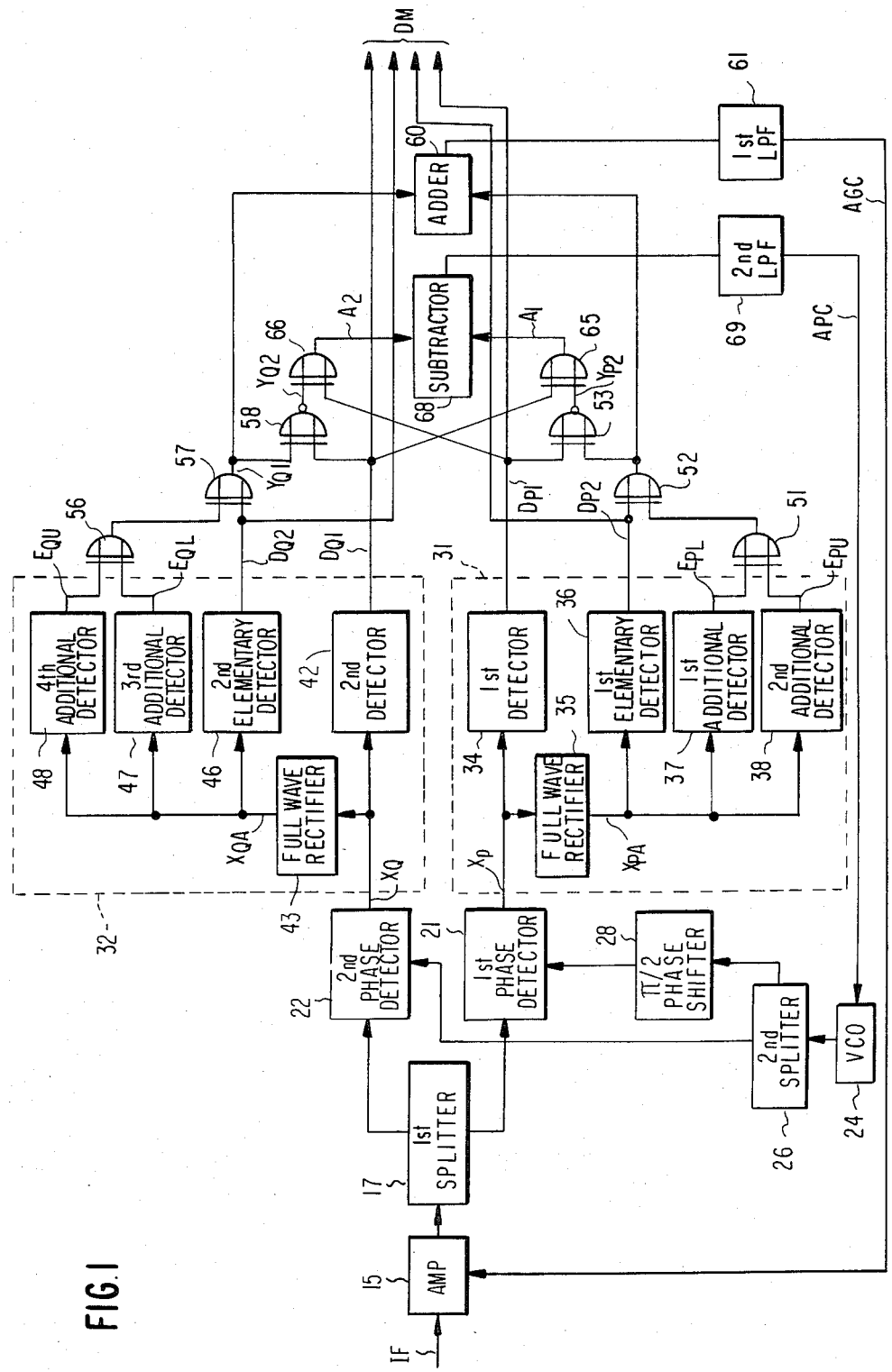
FIG. 1 shows a block diagram of a demodulator according to a first embodiment of this invention.

Referring to FIG. 1, a demodulator according to a first embodiment of this invention is for use in a four-by-four quadrature amplitude modulation system, namely 16-QAM system. It is readily understood under the circumstances that k and N are equal to four and two, respectively. The demodulator comprises a gain controllable amplifier 15 supplied with an intermediate frequency signal IF which is subjected to the above-mentioned QAM and which may be called a demodulator input signal. The gain controllable amplifier 15 is also supplied with an automatic gain control signal (AGC) produced in a manner to be later described. As a result, the amplifier 15 produces a gain controlled signal. The gain controlled signal has a first and a second phase component having a quadrature phase difference relative to each other and a first and a second input level, respectively. Each of the first and the second input levels is variable between a first predetermined level and a k-th, namely, a fourth predetermined level lower than the first predetermined level. In other words, each of the first and the second input levels is put into a specific one of the first through the k-th predetermined levels. The first through the k-th predetermined levels may be called first through k-th successively descending levels, respectively.

The gain controlled signal is delivered through a first signal separator or a first splitter 17 to first and second phase detectors 21 and 22 each of which carries out coherent detection of the gain controlled signal with reference to a first reference carrier signal and a second reference carrier signal having a quadrature phase difference relative to the first reference carrier signal. In order to produce the first and the second reference carrier signals, the demodulator comprises a voltage-controlled oscillator 24 responsive to an automatic phase control signal APC (to be later detailed) for producing a local oscillation signal. The local oscillation signal is divided through a second splitter 26 into two parts one of which is given through a $\pi/2$-phase shifter 28 to the first phase detector 21 as the first reference carrier signal and the other of which is given to the second phase detector 22 as the second reference carrier signal.

At any rate, a combination of the first and the second phase detectors 21 and 22, the voltage-controlled oscillator 24, the second splitter 26, and the $\pi/2$-phase shifter 28 serves to carry out the coherent detection and may therefore be called a coherent detection circuit. As a result of the coherent detection, the first and the second phase detectors 21 and 22 produce first and second detection signals $X_P$ and $X_Q$.

Figure 2:
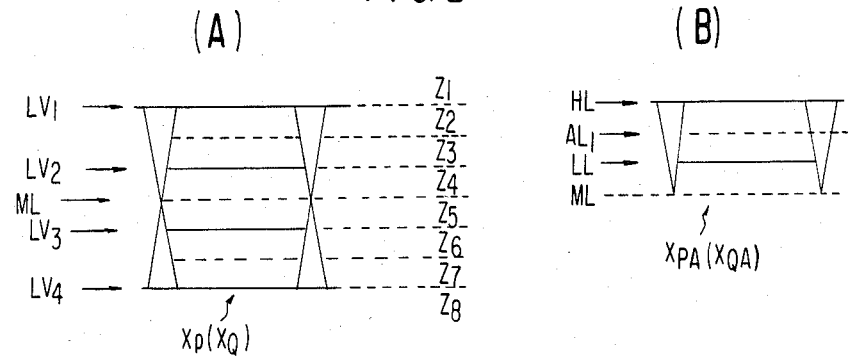
FIG. 2 shows a view for describing operation of the demodulator illustrated in FIG. 1.

Temporarily referring to FIG. 2(A), the first and the second detection signals $X_P$ and $X_Q$ have first and second detection levels corresponding to the first and the second input levels, respectively. Therefore, each of the first and the second detection levels takes one of first through k-th, namely, fourth prescribed levels $LV_1$, $LV_2$, $LV_3$, and $LV_4$ (shown by solid lines) corresponding to the first through the fourth successively descending levels, respectively. A median level ML is provided between the first and the fourth prescribed levels. The median level is different from the first through the k-th prescribed levels. It is assumed that a level distance between two adjacent ones of the first through the fourth prescribed levels is constant. It is readily understood that the first and the second prescribed levels are symmetric to the fourth and the third prescribed levels on both sides of the median level.

Referring back to FIG. 1, the first and the second detection signals $X_P$ and $X_Q$ are supplied to first and second processing circuits 31 and 32 for processing the first and the second detection signals $X_P$ and $X_Q$, respectively. The first processing circuit 31 produces a first set of binary signals $D_{P1}$ and $D_{P2}$ and a first additional binary signal in a manner to be described later. Likewise, the second processing circuit 32 produces a second set of binary signals $D_{Q1}$ and $D_{Q2}$ and a second additional binary signal. In the example being illustrated, each of the first and the second additional binary signals consists of a pair of partial bit signals $E_{PL}$ ($E_{QL}$) and $E_{PU}$ ($E_{QU}$) as will later be described in detail. The partial bit signals $E_{PL}$ and $E_{PU}$ may be referred to as first and second partial bit signals, respectively, while the partial bit signals $E_{QL}$ and $E_{QU}$, third and fourth partial bit signals, respectively.

The first set of the binary signals $D_{P1}$ and $D_{P2}$ is representative of the first detection level of the first detection signal $X_P$ while the second set of the binary signals $D_{Q1}$ and $D_{Q2}$, the second detection level of the second detection signal $X_Q$. Therefore, a combination of the first and the second sets is produced as demodulated signals DM. The first-set binary signals $D_{P1}$ and $D_{P2}$ may be called a first most significant bit signal and a first less significant bit signal, respectively, while the second-set binary signals $D_{Q1}$ and $D_{Q2}$, a second most significant bit signal and a second less significant bit signal, respectively.

Such first and second processing circuits may be analog-to-digital converters. However, use of the analog-to-digital converters results in an increase of costs, as pointed out in the preamble of the instant specification.

The first processing circuit 31 illustrated in FIG. 1 comprises a first binary detector 34 having a first reference level equal to the median level ML. Responsive to the first detection signal $X_P$, the first binary detector 34 produces the first most significant bit signal $D_{P1}$ that represents whether or not the first detection level is higher than the first reference level.

Referring to FIGS. 2(A) and 2(B) together with FIG. 1, the first processing circuit 31 comprises a full-wave rectifier 35 responsive to the first detection signal $X_P$. The full-wave rectifier 35 has a rectifying level equal to the median level ML and carries out full-wave rectification of the first detection signal $X_P$ in relation to the rectifying level to produce a rectified signal $X_{PA}$. The rectified signal $X_{PA}$ is like the first detection signal $X_P$ folded relative to the rectifying level (ML), as illustrated in FIG. 2(B) and, therefore, has a rectified level determined by the first detection signal $X_P$. More specifically, the rectified level is variable between a low rectified level LL and a high rectified level HL. The low rectified level LL corresponds to the second and the third prescribed levels $LV_2$ and $LV_3$ while the high rectified level HL, the first and the fourth prescribed levels $LV_1$ and $LV_4$. The full-wave rectifier 35 may be called a first rectifying circuit.

The rectified signal $X_{PA}$ is given to a first elementary binary detector 36 and moreover to first and second additional binary detectors 37 and 38 all of which are operable to derive, from the rectified signal $X_{PA}$, the first less significant bit signal $D_{P2}$ and the first and the second partial bit signals $E_{PL}$ and $E_{PU}$. The first elementary binary detector 36 has a first elementary reference level $AL_1$ (FIG. 2(B)) between the low and the high rectified levels LL and HL. It is to be noted here that the first elementary reference level $AL_1$ is different from both of the low and the high rectified levels LL and HL. This means that the first elementary reference level $AL_1$ corresponds to both levels (shown by dashed lines in FIG. 2(A)) between the first and the second prescribed levels $LV_1$ and $LV_2$ and between the third and the fourth prescribed levels $LV_3$ and $LV_4$.

Anyway, the first elementary binary detector 36 detects whether or not the rectified level is higher than the first elementary reference level $AL_1$ and produces the first less significant bit signal $D_{P2}$. The first less significant bit signal $D_{P2}$ may be referred to as a first subordinate bit signal. Thus, a combination of the first reference level and the first elementary reference level $AL_1$ enables discrimination of the first through the fourth prescribed levels $LV_1$ to $LV_4$. It is therefore readily understood that the first-set binary signals $D_{P1}$ and $D_{P2}$ serve as a part of the demodulated signals DM, as mentioned before.

The first additional binary detector 37 has a first additional reference level equal to the low rectified level LL when no variation takes place in the rectified signal $X_{PA}$. The first additional reference level corresponds to both of the second and the third prescribed levels $LV_2$ and $LV_3$ shown in FIG. 2(A). Responsive to the rectified signal $X_{PA}$, the first additional binary detector 37 detects whether or not the rectified level is higher than the first additional reference level and produces the first partial bit signal $E_{PL}$ as a result of the detection. The first partial bit signal $E_{PL}$ may be referred to as a second subordinate bit signal.

Likewise, the second additional binary detector 38 has a second additional reference level equal to the high rectified level HL when no variation occurs in the rectified signal $X_{PA}$. As a result, the second additional reference level corresponds to both of the first and the fourth prescribed levels $LV_1$ and $LV_4$ illustrated in FIG. 2(A). Supplied with the rectified signal $X_{PA}$, the second binary detector 38 produces the second partial bit signal $E_{PU}$ that represents whether or not the rectified signal $X_{PA}$ is higher than the second additional reference level. The second partial bit signal $E_{PU}$ may be called a third subordinate bit signal.

A combination of the first elementary binary detector 36 and the first and the second additional binary detectors 37 and 38 may be referred to as a first discriminating circuit.

Thus, the first processing circuit 31 comprises a combination of four binary detectors 34, 36, 37, and 38 and a single full-wave rectifier 35 and can divide the first detection level ($X_{PA}$) into first through eighth level zones $Z_1$ to $Z_8$, as shown in FIG. 2(A). In other words, four levels of the first detection signal $X_{PA}$ can be specified by the first through the eighth level zones $Z_1$ to $Z_8$. This is for detecting variation of the first detection level, as will become clear as the description proceeds.

The second processing circuit 32 is similar in operation and in structure to the first processing circuit 31 except that the second processing circuit 32 is put into operation in response to the second detection signal $X_Q$ to produce the second set of the binary signals $D_{Q1}$ and $D_{Q2}$ and the second additional binary signal ($E_{QL}$ and $E_{QU}$) by the use of a rectified signal $X_{QA}$ internally produced in the second processing circuit 32. In order to produce the above-mentioned signals, the second processing circuit 32 comprises a second binary detector 42, a full-wave rectifier 43, a second elementary binary detector 46, and third and fourth additional binary detectors 47 and 48. The full-wave rectifier 43 may be referred to as a second rectifying circuit and a combination of the second elementary binary detector 46 and the third and the fourth additional binary detectors 47 and 48 may be called a second discriminating circuit.

In FIG. 1, a circuit arrangement is coupled to the first and the second processing circuits 31 and 32 to derive the automatic phase control signal APC and the automatic gain control signal AGC from the first and the second sets of the binary signals $D_{P1}$, $D_{P2}$; and $D_{Q1}$, $D_{Q2}$ and the first and the second additional binary signals ($E_{PL}$, $E_{PU}$; $E_{QL}$, $E_{QU}$). More particularly, the circuit arrangement comprises a first Exclusive OR circuit 51 supplied as the first additional binary signal with the first and the second partial bit signals $E_{PL}$ and $E_{PU}$ and a second Exclusive OR circuit 52 coupled to the first Exclusive OR circuit 51 and supplied with the first less significant bit signal $D_{P2}$. As a result, a pair of the first and the second Exclusive OR circuits 51 and 52 produce a first internal signal $Y_{P1}$ given by:

$$Y_{P1} = E_{PL} \oplus E_{PU} \oplus D_{P2} \tag{1}$$

A first Exclusive NOR circuit 53 is supplied with the first internal signal $Y_{P1}$ and the first most significant bit $D_{P1}$ to produce a second internal signal $Y_{P2}$ given by:

$$Y_{P2} = \overline{Y_{P1} \oplus D_{P1}} = \overline{E_{PL} \oplus E_{PU} \oplus D_{P1} \oplus D_{P2}}. \tag{2}$$

Likewise, third and fourth Exclusive OR circuits 56 and 57 produce a third internal signal $Y_{Q1}$ given by:

$$Y_{Q1} = E_{QL} \oplus E_{QU} = \oplus D_{Q2} \tag{3}$$

and a second Exclusive NOR circuit 58 carries out an Exclusive NOR operation to produce a fourth internal signal $Y_{Q2}$ given by:

$$Y_{Q2} = \overline{E_{QL} \oplus E_{QU} \oplus D_{Q2} \oplus D_{Q1}}. \tag{4}$$

The first through the fourth internal signals $Y_{P1}$, $Y_{P2}$, $Y_{Q1}$ and $Y_{Q2}$ are determined by the first through the eighth level zones $Z_1$ to $Z_8$ for each of the first and the second detection signals $X_P$ and $X_Q$.

Table 1 shows a truth table which gives relationships between the level zones $Z_1$ to $Z_8$ and the above-mentioned various signals $D_{P1}$, $D_{P2}$, $E_{PL}$, $E_{PU}$, $Y_{P1}$, and $Y_{P2}$ or $D_{Q1}$, $D_{Q2}$, $E_{QL}$, $E_{QU}$, $Y_{Q1}$, and $Y_{Q2}$.

TABLE 1

| LEVEL ZONES | $DP_1$ ($D_{Q1}$) | $E_{PU}$ ($E_{QU}$) | $D_{P2}$ ($D_{Q2}$) | $E_{PL}$ ($E_{QL}$) | $Y_{P1}$ ($Y_{Q1}$) | $Y_{P2}$ ($Y_{Q2}$) |
|---|---|---|---|---|---|---|
| 1 | 1 | 1 | 1 | 1 | 1 | 1 |
| 2 | 1 | 0 | 1 | 1 | 0 | 0 |
| 3 | 1 | 0 | 0 | 1 | 1 | 1 |
| 4 | 1 | 0 | 0 | 0 | 0 | 0 |
| 5 | 0 | 0 | 0 | 0 | 0 | 1 |
| 6 | 0 | 0 | 0 | 1 | 1 | 0 |
| 7 | 0 | 0 | 1 | 1 | 0 | 1 |
| 8 | 0 | 1 | 1 | 1 | 1 | 0 |

As already pointed out in the above-referenced Japanese Unexamined Patent Publication No. 131152/1982, the first and the third internal signals $Y_{P1}$ and $Y_{Q1}$ serve to produce the automatic gain control signal AGC. More specifically, logic levels in the first through the fourth level zones $Z_1$ to $Z_4$ for each of the first and the third internal signals $Y_{P1}$ and $Y_{Q1}$ are reverse in polarity to the logic levels in the fifth through the eighth level zones $Z_5$ to $Z_8$ therefor, respectively. This means that variation or fluctuation of each of the first and the second detection signal $X_P$ and $X_Q$ can be specified by the use of the first and the third internal signals $Y_{P1}$ and $Y_{Q1}$. In the illustrated circuit arrangement, an adder 60 sums up the first and the third internal signals $Y_{P1}$ and $Y_{Q1}$ to supply the automatic gain control signal AGC through a first low pass filter 61 to the gain controllable amplifier 15. Either one of the first and the third internal signals $Y_{P1}$ and $Y_{Q1}$ may be supplied as the automatic gain control signal AGC to the amplifier 15 through the first low pass filter 61.

On the other hand, each of the second and the fourth internal signals $Y_{P2}$ and $Y_{Q2}$ has the logic "0" levels in every other one of the first through the eighth level zones $Z_1$ to $Z_8$ and the logic "1" levels in the remaining level zones, as shown in Table 1. As described in the other of the above-referenced Japanese Unexamined Patent Publications, such signals serve to produce the automatic phase control signal APC because the automatic phase control signal APC is given by:

$$Y_{Q2} \cdot D_{P1} - Y_{P2} \cdot D_{Q1}. \quad (5)$$

Inasmuch as multiplications, such as $Y_{P2} \cdot D_{Q1}$; $Y_{Q2} \cdot D_{P1}$, can be accomplished by Exclusive OR circuits, as known in the art, the circuit arrangement comprises a fifth Exclusive OR circuit 65 responsive to the second internal signal $Y_{P2}$ and the second most significant bit signal $D_{Q1}$ and a sixth Exclusive OR circuit 66 responsive to the fourth internal signal $Y_{Q2}$ and the first most significant bit signal. As a result, the fifth Exclusive OR circuit 65 produces a first product signal $A_1$ represented by $Y_{P2} \cdot D_{Q1}$ while the sixth Exclusive OR circuit 66, a second product signal $A_2$ represented by $Y_{Q2} \cdot D_{P1}$.

Supplied with the first and the second product signals $A_1$ and $A_2$, a subtractor 68 carries out subtraction shown by the formula (5) to produce a difference signal representative of a difference between $Y_{Q2} \cdot D_{P1}$ and $Y_{P2} \cdot D_{Q1}$. The difference signal is supplied as the automatic phase control signal APC to the voltage-controlled oscillator 24 through a second low pass filter 69.

Thus, the demodulator illustrated in FIG. 1 is capable of concurrently producing the automatic gain control signal AGC and the automatic phase control signal APC without any analog-to-digital converters. In addition, it is unnecessary to use any multipliers unstable in characteristics and intricate in structure. The demodulator is therefore inexpensive. An eye aperture appearing in an eye pattern after demodulation is kept substantially constant because of production of the automatic gain control signal AGC and absence of multipliers.

Figure 3:
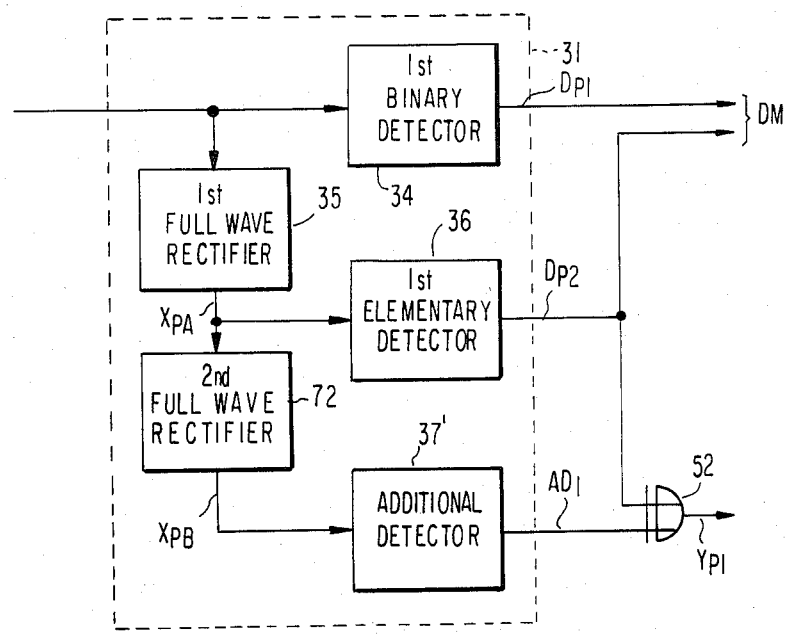
FIG. 3 shows in blocks a part of a demodulator according to a second embodiment of this invention.

Referring to FIG. 3, a demodulator according to a second embodiment of this invention is represented by a first processing circuit 31 because a second processing circuit 32 is similar to the first processing circuit 31 and the other parts are similar to those illustrated in FIG. 1 except that the first Exclusive OR circuit 51 is removed from FIG. 3. In FIG. 3, the first processing circuit 31 comprises the first binary detector 34 and the full-wave rectifier 35, and the elementary binary detector 36 similar to those illustrated in FIG. 1. A single additional binary detector 37' alone is included in the first processing circuit 31. For convenience of description, the illustrated full-wave rectifier 35 will be referred to as a first full-wave rectifier.

Figure 4:
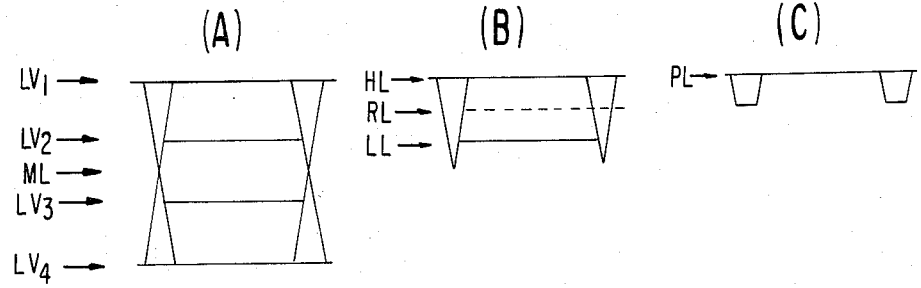
FIG. 4 shows a view for describing operation of the demodulator illustrated in FIG. 3.

Referring to FIG. 4 together with FIG. 3, the first full-wave rectifier 35 has the rectifying level equal to the median level ML (FIG. 4(A)), as is the case with the full-wave rectifier illustrated in FIG. 1. The rectifying level may be called a first rectifying level. The first full-wave rectifier 35 carries out full-wave rectification in relation to the first rectifying level to produce the rectified signal $X_{PA}$ (will be referred to as a first rectified signal) having the rectified level variable between the low rectified level LL and the high rectified level HL, both inclusive, as illustrated in FIG. 4(B).

The first rectified signal $X_{PA}$ is supplied to a second full-wave rectifier 72 having a second rectifying level RL intermediate between the high and the low rectified levels HL and LL, as shown in FIG. 4(B). The second full-wave rectifier 72 carries out full-wave rectification in relation to the second rectifying level RL to produce a second rectified signal $X_{PB}$ having an additional rectified level depicted by a solid line in FIG. 4(C). The additional rectified level corresponds to the first through the fourth prescribed levels $LV_1$, $LV_2$, $LV_3$, and $LV_4$ and is variable with reference to a preselected level PL. In other words, the first through the fourth prescribed levels $LV_1$, $LV_2$, $LV_3$, and $LV_4$ are converted into a single level by the use of the first and the second full-wave rectifiers 35 and 72. Thus, a combination of the first and the second full-wave rectifiers 35 and 72 serves as a first rectifying circuit.

The first rectified signal $X_{PA}$ is given to the first elementary binary detector 36 to be processed in the manner described with reference to FIG. 1. As a result, the first elementary binary detector 36 produces the first less significant bit signal $D_{P2}$ as a first subsidiary bit signal.

On the other hand, the second rectified signal $X_{PB}$ is sent to the additional binary detector 37' having a secondary reference level equal to the preselected level PL. The additional binary detector 37' detects whether or not the additional rectified level is higher than the secondary reference level (PL) and produces a second subsidiary bit signal as the first additional binary signal depicted at $AD_1$.

From this fact, it is readily understood that the first detection level is divided into first through eighth level zones, as is the case with the first processing circuit 31 illustrated in FIG. 1 and that a combination of the first set of the binary signals and the first additional binary signal $AD_1$ can specify each of the first through the eighth level zones.

The circuit arrangement comprises the second Exclusive OR circuit 52 responsive to the first less significant bit signal $D_{P2}$ and the first additional bit signal $AD_1$ for carrying out an Exclusive OR operation to produce a first internal signal. The first internal signal is identical with that illustrated with reference to FIG. 1, as will presently become clear, and is therefore depicted at $Y_{P1}$ in FIG. 3. The first internal signal $Y_{P1}$ is delivered to the first Exclusive NOR circuit 53 (FIG. 1) to produce the second internal signal $Y_{P2}$ and to the adder 60 (FIG. 1).

The second processing circuit 32 produces the second set of the binary signals $D_{Q1}$ and $D_{Q2}$ and the second additional binary signal $D_{Q3}$ in the above-mentioned manner. The fourth Exclusive OR gate 57 (FIG. 1) is supplied with the second additional binary signal $D_{Q3}$ and the second less significant bit signal $D_{Q2}$ to produce the third internal signal $Y_{Q1}$. The second Exclusive NOR circuit 58 produces the fourth internal signal $Y_{Q2}$ in response to the third internal signal $Y_{Q1}$ and the most significant bit signal $D_{Q1}$.

Table 2 shows a truth table which is similar to Table 1 and which gives the relationships between the first through the eighth level zones and the above-mentioned signals.

TABLE 2

| LEVEL ZONES | $D_{P1}$ ($D_{Q1}$) | $D_{P2}$ ($D_{Q2}$) | $D_{P3}$ ($D_{Q3}$) | $Y_{P1}$ ($Y_{Q1}$) | $Y_{P2}$ ($Y_{Q2}$) |
|---|---|---|---|---|---|
| 1 | 1 | 1 | 1 | 1 | 1 |
| 2 | 1 | 1 | 0 | 0 | 0 |
| 3 | 1 | 0 | 0 | 1 | 1 |
| 4 | 1 | 0 | 1 | 0 | 0 |
| 5 | 0 | 0 | 1 | 0 | 1 |
| 6 | 0 | 0 | 0 | 1 | 0 |
| 7 | 0 | 1 | 0 | 0 | 1 |
| 8 | 0 | 1 | 1 | 1 | 0 |

It is understood from Table 2 that each of the first and the third internal signals $Y_{P1}$ and $Y_{Q1}$ serves to produce the automatic gain control signal AGC while the second and the fourth internal signals $Y_{P2}$ and $Y_{Q2}$, the automatic phase control signal APC, as described in conjunction with Table 1.

Figure 5:
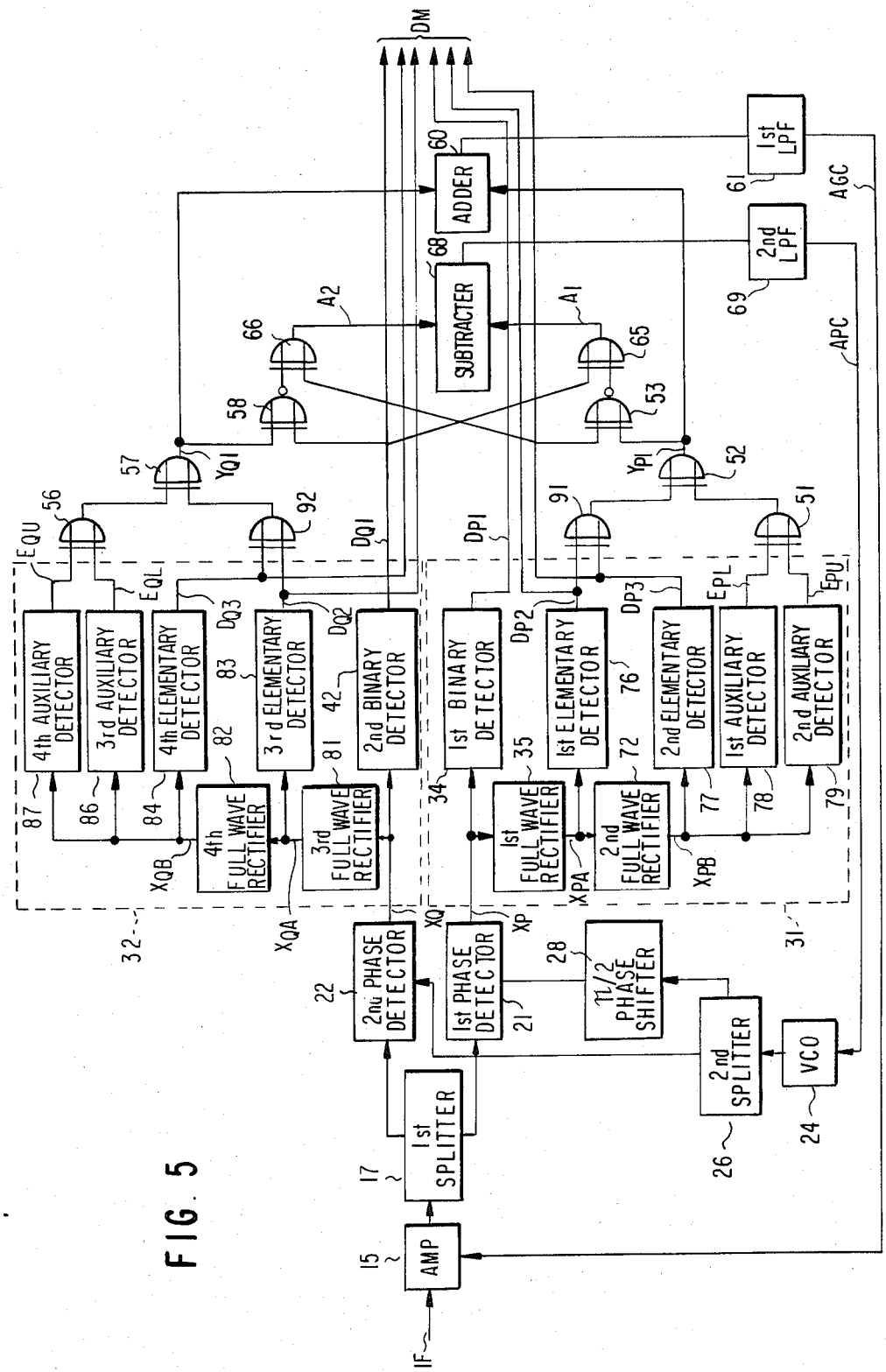
FIG. 5 shows a block diagram of a demodulator according to a third embodiment of this invention.
Figure 6:
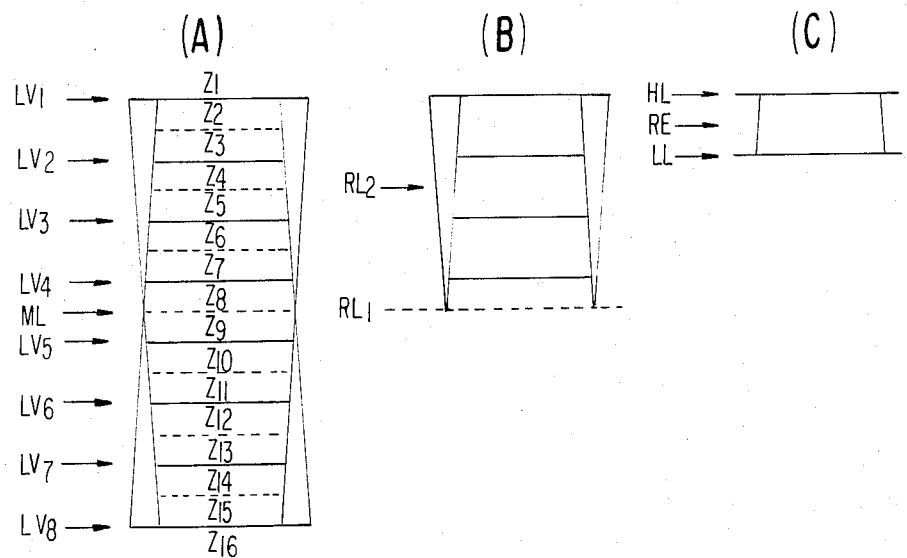
FIG. 6 shows a view for describing operation of the demodulator illustrated in FIG. 5.

Referring to FIG. 5 together with FIG. 6, a demodulator according to a third embodiment of this invention is for use in an eight-by-eight quadrature amplitude modulation system, namely, 64-QAM system. In this system, the numbers k and N are equal to 8 and 3, respectively. Each of the first and the second detection signals $X_P$ and $X_Q$ is variable between first and eighth prescribed levels $LV_1$ and $LV_8$, both inclusive, as illustrated in FIG. 6(A). The first and the eighth prescribed levels may be referred to as the highest and the lowest levels, respectively. A median level ML is provided between the first and the eighth prescribed levels $LV_1$ and $LV_8$, as illustrated in FIG. 6(A).

The illustrated demodulator is implemented by modifying the demodulator illustrated in FIG. 1 and comprises similar parts designated by like reference numerals. It is, however, to be noted that the first and the second processing circuits 31 and 32 are somewhat different from those illustrated in FIG. 1 in order to define first through sixteenth level zones $Z_1$ to $Z_{16}$ in which each of the first and the second detection signals $X_P$ and $X_Q$ is variable. In this connection, a circuit arrangement is also different from that illustrated in FIG. 1.

More particularly, the first processing circuit 31 comprises the first binary detector 34 for producing the first most significant bit signal $D_{P1}$ and a pair of full-wave rectifiers 35 and 72 which are connected in cascade and which will be called first and second full-wave rectifiers, as in the case with FIG. 3. The first full-wave rectifier 35 has a first rectifying level $RL_1$ equal to the median level ML and produces the first rectified signal $X_{PA}$ as shown in FIG. 6(B) after carrying out full-wave rectification of the first detection signal $X_P$ in relation to the first rectifying level $RL_1$. The first rectified signal $X_{PA}$ has a first rectified level taking a preselected one of first, second, third and fourth levels successively descending as depicted at solid lines in FIG. 6(B).

The second full-wave rectifier 72 has a second rectifying level $RL_2$ predetermined between the second and the third levels of the first rectified signal $X_{PA}$ and carries out full-wave rectification of the first rectified signal $X_{PA}$ in relation to the second rectifying level to produce a second rectified signal $X_{PB}$. The second rectified signal $X_{PB}$ has a second rectified level taking one of high and low levels HL and LL as shown in FIG. 6(C).

Thus, a combination of the first and the second full-wave rectifiers 35 and 72 is operable to derive, from the first detection signal $X_P$, a rectified signal of two levels, such as the second rectified signal. It is readily understood that the number of the full-wave rectifiers may be equal to $(N-1)$, in order to produce the rectified signal of two levels.

The first processing circuit 31 comprises first and second elementary binary detectors 76 and 77 responsive to the first and the second rectified signals $X_{PA}$ and $X_{PB}$ for producing, as the remaining part of the first-set binary signals, first less and first least significant bit signals $D_{P2}$ and $D_{P3}$, respectively. The first less and the first least significant bit signals $D_{P2}$ and $D_{P3}$ are produced together with the first most significant bit signal $D_{P1}$ as a part of the demodulated signals DM. More specifically, the first elementary binary detector 76 has a first reference level equal to the second rectifying level $RL_1$ and compares the first rectified level with the first reference level to produce the first less significant bit signal $D_{P2}$ as a result of the comparison.

The second elementary binary detector 77 has a second reference level RE between the high and the low rectified levels HL and LL as illustrated in FIG. 6(C) and produces the first least significant bit signal $D_{P3}$ after comparison of the second rectified signal $X_{PB}$ with the second reference level RE.

Thus, the number of the elementary binary detectors may be equal to $(N-1)$.

The first processing circuit 31 further comprises first and second auxiliary binary detectors 78 and 79 supplied with the second rectified signal $X_{PB}$. The first and the second auxiliary binary detector 78 have first and second auxiliary reference levels equal to the low rectified level LL and the high rectified level HL, respectively, as long as the second rectified level is invariable. Each of the first and the second auxiliary binary detectors 78 and 79 detects whether or not the second rectified level is higher than each of the first and the second auxiliary reference levels and produces each of first and second partial bit signals $E_{PL}$ and $E_{PU}$ as the additional binary signal.

From this fact, it is readily understood that the second elementary binary detector 77 and the first and the second auxiliary binary detectors 78 and 79 are similar in operation to the elementary binary detector 36 and the first and the second additional binary detectors 37 and 38 illustrated in FIG. 1, respectively.

A combination of the first and the second full-wave rectifiers 35 and 72 may be called a first rectifying circuit while the first and the second elementary binary detectors 76 and 77 may be referred to as a first discriminating circuit together with the first and the second auxiliary binary detectors 78 and 79.

The second processing circuit 32 is similar in operation and structure to the first processing circuit 31 and therefore comprises the second binary detector 42, a second rectifying circuit, and a second discriminating circuit. The second rectifying circuit comprises third and fourth full-wave rectifiers for producing third and fourth rectified signals $X_{QA}$ and $X_{QB}$ in a manner described in conjunction with the first and the second full-wave rectifiers 35 and 72. The second discriminating circuit comprises third and fourth elementary binary detectors 83 and 84 similar to the first and the second elementary binary detectors 76 and 77, respectively, and third and fourth auxiliary detectors 86 and 87 also similar to the first and the second auxiliary binary detectors 78 and 79, respectively. As a result, the second processing circuit 32 produces the second-set binary signals $D_{Q1}$, $D_{Q2}$, and $D_{Q3}$ and the second additional binary signal which is a combination of third and fourth partial bit signals $E_{QL}$ and $E_{QU}$.

The circuit arrangement is similar to that illustrated in FIG. 1 except that first and second additional Exclusive OR circuits 91 and 92 are added to the illustrated circuit arrangement. The first additional Exclusive OR circuit 91 is connected to the first and the second elementary binary detectors 76 and 77 and the second Exclusive OR circuit 52 while the second additional Exclusive OR circuit 92 is connected to the third and the fourth elementary binary detectors 76 and 77 and the fourth Exclusive OR circuit 57. As a result, the first and the third internal signals $Y_{P1}$ and $Y_{Q1}$ are given by:

$$Y_{P1} = D_{P2} \oplus D_{P3} \oplus E_{PU} \oplus E_{PL}$$

and $$Y_{Q1} = D_{Q2} \oplus D_{Q3} \oplus E_{QU} \oplus E_{QL},$$

respectively.

Similarly, the second and the fourth internal signals $Y_{P2}$ and $Y_{Q2}$ are given by:

$$Y_{P2} = D_{P1} \oplus D_{P2} \oplus D_{P3} \oplus E_{P0} \oplus E_{PL}$$

and $$Y_{Q2} = D_{Q1} \oplus D_{Q2} \oplus D_{Q3} \oplus E_{Q0} \oplus E_{QL},$$

respectively.

Table 3 gives the relationships between each of the first through the sixteenth level zones $Z_1$ to $Z_{16}$ and the above-mentioned signals.

TABLE 3

| LEVEL ZONES | $D_{P1}$ ($D_{Q1}$) | $D_{P2}$ ($D_{Q2}$) | $D_{P3}$ ($D_{Q3}$) | $E_{PU}$ ($E_{QU}$) | $E_{PL}$ ($E_{QL}$) | $Y_{P1}$ ($Y_{Q1}$) | $Y_{P2}$ ($Y_{Q2}$) |
|---|---|---|---|---|---|---|---|
| 1 | 1 | 1 | 1 | 1 | 1 | 1 | 1 |
| 2 | 1 | 1 | 1 | 0 | 1 | 0 | 0 |
| 3 | 1 | 1 | 0 | 0 | 1 | 1 | 1 |
| 4 | 1 | 1 | 0 | 0 | 0 | 0 | 0 |
| 5 | 1 | 0 | 0 | 0 | 0 | 1 | 1 |
| 6 | 1 | 0 | 0 | 0 | 1 | 0 | 0 |
| 7 | 1 | 0 | 1 | 0 | 1 | 1 | 1 |

TABLE 3-continued

| LEVEL ZONES | $D_{P1}$ ($D_{Q1}$) | $D_{P2}$ ($D_{Q2}$) | $D_{P3}$ ($D_{Q3}$) | $E_{PU}$ ($E_{QU}$) | $E_{PL}$ ($E_{QL}$) | $Y_{P1}$ ($Y_{Q1}$) | $Y_{P2}$ ($Y_{Q2}$) |
|---|---|---|---|---|---|---|---|
| 8 | 1 | 0 | 1 | 1 | 1 | 0 | 0 |
| 9 | 0 | 0 | 1 | 1 | 1 | 0 | 1 |
| 10 | 0 | 0 | 1 | 0 | 1 | 1 | 0 |
| 11 | 0 | 0 | 0 | 0 | 1 | 0 | 1 |
| 12 | 0 | 0 | 0 | 0 | 0 | 1 | 0 |
| 13 | 0 | 1 | 0 | 0 | 0 | 0 | 1 |
| 14 | 0 | 1 | 0 | 0 | 1 | 1 | 0 |
| 15 | 0 | 1 | 1 | 0 | 1 | 0 | 1 |
| 16 | 0 | 1 | 1 | 1 | 1 | 1 | 0 |

From Table 3, it is readily understood that the first and the third internal signals $Y_{P1}$ and $Y_{Q1}$ are usable to produce the automatic gain control signal AGC while the second and the fourth internal signals $Y_{P2}$ and $Y_{Q2}$, the automatic phase control signal APC, as described in conjunction with FIG. 1.

Figure 7:
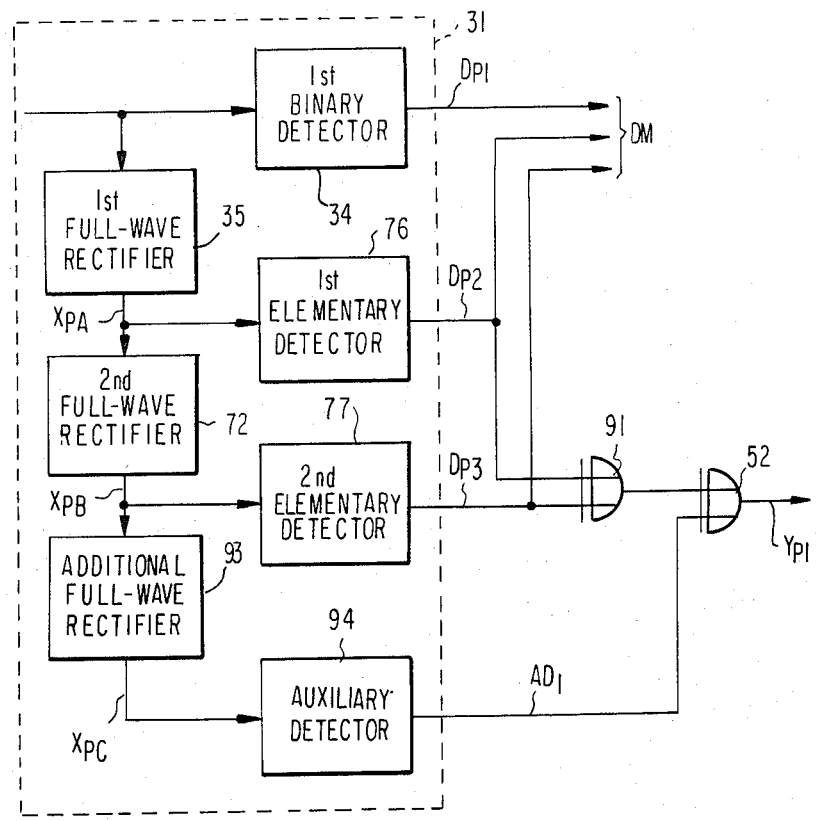
FIG. 7 shows in blocks a part of a demodulator according to a fourth embodiment of this invention.

Referring to FIG. 7, a demodulator according to a fourth embodiment of this invention is for use in the eight-by-eight quadrature amplitude modulation system, as is the case with FIG. 5, and is implemented by modifying the demodulator illustrated with reference to FIG. 3. The first processing circuit 31 alone is illustrated in FIG. 7 because the second processing circuit 32 is similar to the first processing circuit 31 and the remaining portions are similar to those illustrated in FIG. 5 except that the first and the third Exclusive OR circuits 51 and 56 are removed from the circuit arrangement illustrated in FIG. 7.

The illustrated first processing circuit 31 is similar to that illustrated in FIG. 5 except that a first additional full-wave rectifier 93 is attached to the second full-wave rectifier 72 and a single auxiliary binary detector 94 alone is used instead of the first and the second auxiliary binary detectors 78 and 79. As a result, the number of the full-wave rectifiers 35, 72, and 93 is rendered equal to N. Likewise, the number of the binary detectors 34, 76, 77, and 94 becomes equal to (N+1).

Referring to FIG. 6 together with FIG. 7, the first additional full-wave rectifier 93 has a first additional rectifying level equal to the second reference level RE shown in FIG. 6(C) and full-wave rectifies the second rectified signal $X_{PB}$ in relation to the first additional rectifying level to produce a first additional rectified signal $X_{PC}$ having a first additional rectified level as shown in FIG. 4(C). The auxiliary binary detector 94 has a reference level equal to the preselected level PL and detects variation of the first additional rectified level in relation to the reference level. A result of detection is produced as the first additional binary signal $AD_1$ from the auxiliary binary detector 94.

The first additional binary signal $AD_1$ is supplied direct to the second Exclusive OR circuit 52 responsive to the second detected signal $DP_3$.

With this structure, the first output signal $Y_{P1}$ can be produced as is the case with the first processing circuit 31 illustrated in FIG. 5.

While this invention has thus far been described in conjunction with several preferred embodiments thereof, it will be readily possible for those skilled in the art to put this invention into practice in various other manners. For example, k ($=2^N$) may be 16, 32, 64, 128, or so. In this event, a pair of partial bit signals $E_{PL}$ ($E_{QL}$) and $E_{PU}$ ($E_{QU}$) may be produced as the additional binary signal by repeating full-wave rectifications (N−1)-times to obtain a signal of two levels and by discriminating the signal by the use of three binary detectors. Alternatively, the additional binary signal may be produced by successively carrying out full-wave rectifications N-times to derive a single level signal from a k-level signal and by comparing the single level signal with a reference level. At any rate, both of the automatic gain control signal and the automatic phase control signal are obtained by processing the additional binary signal.

What is claimed is:

1. In a demodulator for demodulating a gain controlled signal having a first and a second phase component into demodulated signals, said first and said second phase components having a quadrature phase difference relative to each other and a first and a second input level, respectively, said demodulator comprising:
a gain controllable amplifier responsive to an automatic gain control signal for gain-controlling a demodulator input signal to produce said gain controlled signal with said first and said second input levels given a first and a second one of first through k/2-th and (k/2+1)-th through k-th successively descending levels at a time, respectively, where k is equal to $2^N$ where, in turn, N represents an integer greater than unity, said first through said k/2-th levels being symmetric to said k-th through said (k/2+1)-th levels on both sides of a median level;
coherent detecting means responsive to an automatic phase control signal for detecting said first and said second phase components to produce first and second detection signals, respectively, said first detection signal having a first detection level corresponding to said first input level, said second detection signal having a second detection level corresponding to said first input level;
first processing means for processing said first detection signal to produce a first set of binary signals and a first additional binary signal, said first set being representative of said first detection level and comprising a first most significant bit signal and at least one first less significant bit signal;
second processing means for processing said second detection signal to produce a second set of binary signals and a second additional binary signal, said second set being representative of said second detection level and comprising a second most significant bit signal and at least one second less significant bit signal;
output producing means for producing said first and said second sets as said demodulated signals;
gain control signal producing means responsive to at least one of a combination of said first set and said first additional binary signal and another combination of said second set and said second additional binary signal for producing said automatic gain control signal; and
phase control signal producing means responsive to said first and said second sets and said first and said second additional binary signals for producing said automatic phase control signal;
the improvement wherein:
said first processing means comprises:
a first binary detector having a first reference level equal to said median level and responsive to said first detection signal for detecting whether or not said first detection level is higher than said first reference level to produce said first most significant bit signal;
first full-wave rectifying means for carrying out full-wave rectification of said first detection signal to produce a first rectified signal; and
first discriminating means coupled to said first full-wave rectifying means for discriminating said first less significant bit signal and said first additional binary signal from said first rectified signal;
said second processing means comprising:
a second binary detector having a second reference level equal to said first reference level and responsive to said second detection signal for detecting whether or not said second detection level is higher than said second reference level to produce said second most significant bit signal;
second full-wave rectifying means for carrying out full-wave rectification of said second detection signal to produce a second full-wave rectified signal; and
second discriminating means coupled to said second full-wave rectifying means for discriminating said second less significant bit signal and said second additional binary signal from said second rectified signal.

2. A demodulator as claimed in claim 1, N being equal to two, wherein a preselected one of said first and said second full-wave rectifying means comprises:
a full-wave rectifier for full-wave rectifying a preselected one of said first and said second detection signals in relation to said median level to produce a preselected one of said first and second rectified signals, said preselected one of said first and said second rectified signals having a rectified level which is determined by said preselected detection signal and which is variable between a low and a high rectified level determined by said preselected detection signal in relation to said median level;
a preselected one of said first and said second discriminating means being coupled to said full-wave rectifier and comprising:
a first additional binary detector having a first additional reference level between said low and said high rectified levels and responsive to said preselected rectified signal for detecting whether or not said rectified level is higher than said first additional reference level to produce a first subordinate bit signal as said first less significant bit signal;
a second additional binary detector having a second additional reference level substantially equal to said low rectified level and responsive to said preselected rectified signal for detecting whether or not said rectified level is higher than said second additional reference level to produce a second subordinate bit signal as a part of a preselected one of said first and said second additional binary signals; and
a third additional binary detector having a third additional reference level substantially equal to said high rectified level and responsive to said preselected rectified signal for detecting whether or not said rectified level is higher than said third additional reference level to produce a third subordinate bit signal as the remaining part of said preselected additional binary signal.

3. A demodulator as claimed in claim 1, N being equal to two, wherein a preselected one of said first and said second full-wave rectifying means comprises:
a first full-wave rectifier having a first rectifying level equal to said median level for full-wave rectifying each of said first and said second detection signals in relation to said median level to produce a preselected one of said first and said second rectified signals, said preselected rectified signal having a rectified level which is determined by said preselected detection level and which is variable between a high and a low rectified level determined by said preselected detection signal in relation to said first rectifying level; and a second full-wave rectifier having a second rectifying level intermediate between said high and said low rectified levels and responsive to said preselected rectified signal for carrying out full-wave rectification of said preselected rectified signal in relation to said second rectifying level to produce an additional rectified signal having an additional rectified level variable in relation to a preselected level;

a preselected one of said first and said second discriminating means being coupled to said preselected full-wave rectifying means and comprising:

a first subsidiary binary detector having a first subsidiary reference level between said high and said low rectified levels and responsive to said preselected rectified signal for detecting whether or not said rectified level of said preselected rectified signal is higher than said first subsidiary reference level to produce a first subsidiary bit signal as a preselected one of said first and said second less significant bit signals; and a second subsidiary binary detector having a second subsidiary reference level equal to said preselected level and responsive to said additional rectified signal for detecting whether or not said additional rectified level is higher than said second subsidiary reference level to produce a second subsidiary bit signal as a preselected one of said first and said second additional binary signals.

4. A demodulator as claimed in claim 1, N being an integer greater than two, wherein a preselected one of said first and said second full-wave rectifying means comprises:

first through (N−1)-th full-wave rectifiers connected in cascade with a preselected one of said first and said second detection signals supplied to said first rectifier for producing first through (N−1)-th rectified signals with reference to rectifying levels allotted to said first through (N−1)-th rectifiers, respectively, said (N−1)-th rectified signal being variable between a high and a low rectified level, inclusive, on both sides of a middle level, exclusive;

a preselected one of said first and said second discriminating means being coupled to said preselected full-wave rectifying means and comprising:

first through (N−1)-th binary detecting means responsive to said first through said (N−1)-th rectified signals for producing the remaining part of a preselected one of said first and said second binary signal sets; and first and second auxiliary binary detectors responsive to said (N−1)-th rectified signal and having an upper and a lower reference level substantially equal to said high and said low levels for comparing said (N−1)-th rectified signal with said upper and said lower reference levels to produce a first and a second auxiliary bit signal representative of results of comparison, respectively; and means for producing said first and said second auxiliary bit signals as a preselected one of said first and said second additional binary signals.

5. A demodulator as claimed in claim 1, N being an integer greater than two, wherein a peselected one of said first and said second full-wave rectifying means comprises:

first through N-th full-wave rectifiers connected in cascade with a preselected one of said first and said second detection signals supplied to said first stage rectifier for producing first through N-th rectified signals with reference to rectifying levels allotted to said rectifiers, respectively, said N-th rectified signal being variable between a high and a low level, both inclusive;

a preselected one of said first and said second discriminating means being coupled to said preselected full-wave rectifying means and comprising:

first through (N−1)-th binary detectors responsive to said first through said (N−1)-th rectified signals for producing the remaining part of a preselected one of said first and said second binary signal sets;

a single auxiliary binary detector having an auxiliary reference level substantially equal to said high level and responsive to said N-th rectified signal for comparing said N-th rectified signal with said auxiliary reference level to produce a comparison signal representative of a result of said comparison; and means for producing said comparison signal as a preselected one of said first and said second additional binary signals.

* * * * *